Figure 1:
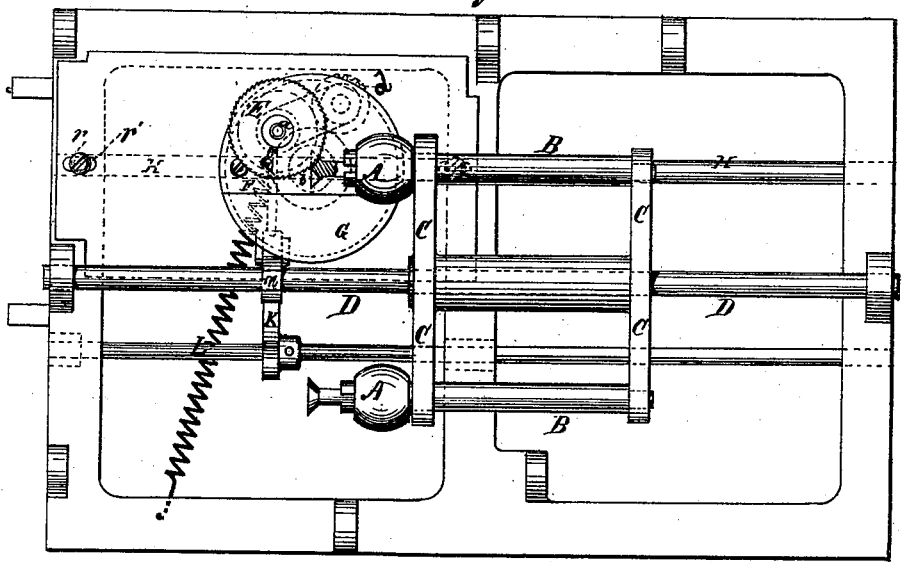

T. J. SLOAN.
MACHINES FOR CUTTING SLOPED NICKS IN WOOD SCREWS.

No. 180,281. Patented July 25, 1876.

Witnesses:
Henry Eickling.
H. Wells Jr.

Inventor:
Thomas J. Sloan
per James A. Whitney
Atty

2 Sheets—Sheet 2.

T. J. SLOAN.
MACHINES FOR CUTTING SLOPED NICKS IN WOOD SCREWS.

No. 180,281. Patented July 25, 1876.

Witnesses:
Henry Eichling.
H. Wells Jr.

Inventor:
Thomas J. Sloan
per James A. Whitney
Atty.

UNITED STATES PATENT OFFICE.

THOMAS J. SLOAN, OF NEW YORK, N. Y.

IMPROVEMENT IN MACHINES FOR CUTTING SLOPED NICKS IN WOOD-SCREWS.

Specification forming part of Letters Patent No. 180,281, dated July 25, 1876; application filed May 5, 1876.

*To all whom it may concern:*

Be it known that I, THOMAS J. SLOAN, of the city, county, and State of New York, have invented certain Improvements in Machinery for Making Slope-Nicked Screws, of which the following is a specification:

This invention relates to the manufacture of that variety of wood-screws in which the nick or groove in the head, instead of being made of uniform depth throughout, is sloped downward from at or near the center of the head, in order to enable, by means of a notched driver, a firmer and more secure hold to be had upon the screw than is possible with the ordinary wood-screw.

My present invention is designed to provide a machine whereby this variety of wood-screws may be manufactured with the same cheapness, facility, and speed as is the case with the ordinary wood-screw made by the usual mechanism.

My invention may be used in connection with the well-known "Sloan Wood-Screw Machinery," suitably modified, or with any other appropriate machinery for shaving the heads of wood-screws.

The invention consists, first, in an organized machine for nicking wood-screws, a nicking-saw combined in such relation with the jaws which hold the screw during the nicking operation, and with appropriate mechanism for giving the just hereinafter-specified movement to the said saw, that said nicking-saw, being first brought opposite the center of the head of the screw or screw-blank, is first moved in one direction to cut one of the sloping sides of the nick, and then in an opposite direction to cut the other side of the nick, returning to the first position to perform the same operation on the succeeding screw, the nicking-saw being thus moved bodily alternately in opposite directions, but having the usual continuous rotary movement in one direction.

The invention further comprises, in combination with the holding-jaw and nicking-saw, a holder supporting the latter, and having its axial movement nearly or quite coincident with the center of the flat or outer end of the head of the screw or blank, whereby the requisite relation of the saw to the said head during the operation of nicking the latter is secured.

The invention further comprises a novel construction of the aforesaid holder in two parts, adjustable with reference to each other, whereby the saw may be adjusted to compensate for any change in diameter of the same from wear or other causes.

The invention further comprises a novel combination of an adjustable holder, carrying the nicking-saw, with the jaw holding the screw or blank during the operation of nicking, whereby the degree of slope given to the opposite sides of the nick may be regulated at will.

Figure 2:
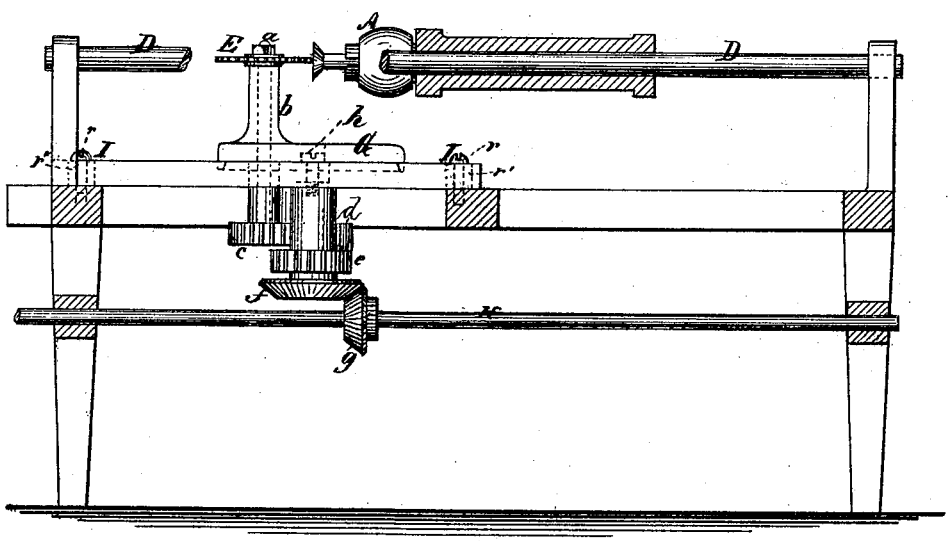
Figure 3:
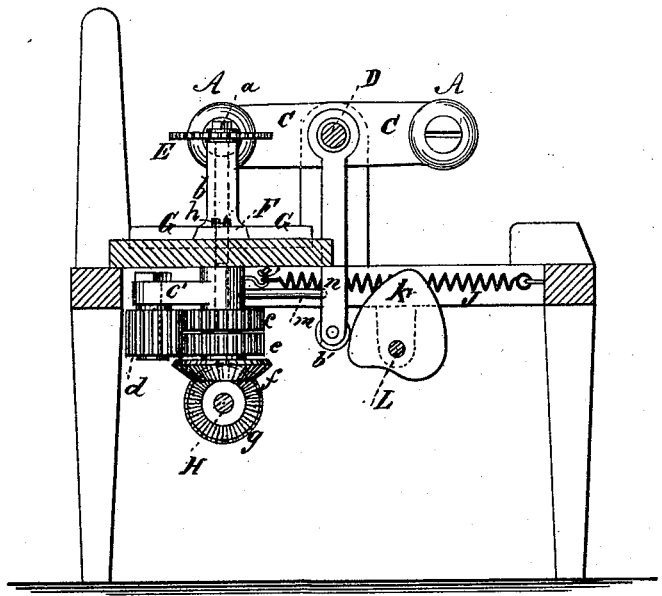

Figure 1 is a plan view, Fig. 2 a longitudinal sectional view, and Fig. 3 a transverse vertical sectional view, of the mechanism embraced in my said invention.

Inasmuch as my invention may be used in connection with the well-known Sloan screw-making machinery, suitably modified by the skill of any competent mechanic, or in connection with any other appropriate machinery, I have not thought it necessary to represent in detail any but the parts immediately concerned in the construction and *modus operandi* of my present invention.

The jaws or holding devices which hold the screw or screw-blank during the operation of nicking are indicated at A, and are carried upon the shafts B, capable of rotation in suitable bearings in the frame C, which is itself supported and capable of turning upon the shaft D. This shaft D makes a semi-revolution at suitable intervals, in order that while one of the jaws is receiving the screw or screw-blank from the feeding apparatus, and the screw-blank is being shaved, the screw or screw-blank held in the other may be subjected to the nicking operation.

The means for rotating the frame C with the shafts B and griping-jaws A, and also the feed mechanism, and any other essential adjuncts, may be the same as those set forth in my Patent No. 173,355, dated February 8, 1876; but it will, of course, be understood that, in lieu of this special arrangement, any other suitable system or arrangement of holding-jaws, with or without feeding mechanism, may be substituted for that herein indicated, it being only necessary, so far as concerns my present invention, that the screw or screw-blank shall have its head presented in due relation with the nicking-saw, as herein presently explained.

E is the nicking-saw, carried upon the upper end of a vertical shaft, $a$, which has its bearing in a vertical sleeve, $b$, provided on a slide, F, capable of longitudinal adjustment in a disk, G, the hereinbefore-specified plate I, slide F, and disk G forming the holder which carries the nicking-saw, and through which, by means of the herein-described mechanism, the requisite movement is communicated to said saw.

Upon the lower end of the shaft $a$ is a spur-pinion, $c$, which gears into a pinion, $d$, which latter has its bearing in an arm, $c'$, on the lower end of the shaft $a$. The said pinion $d$ gears into the spur-wheel $e$, below and upon the same shaft with which is the bevel-wheel $f$. The spur-wheel $e$ and bevel-wheel $f$ are provided with a short stem or shaft, fitting into a sleeve or bearing above, and the bevel-wheel $f$ gears into a corresponding bevel-wheel, $g$, on the shaft H.

It will be seen that motion from the shaft H, transmitted through the bevel-wheels $g\ f$, spur-wheel $e$, pinion $d$, and spur-wheel $c$, will be communicated to the shaft $a$ of the nicking-saw E, giving the requisite rotating movement to the same, irrespective of the movement of the disk G, alternately in opposite directions, as hereinafter explained.

The shaft H, it will be understood, receives its own rotatory motion by suitable connections, not necessary to specify here, with the driving-shaft of the machine. The disk G is pivoted at $h$ to a base-plate, I, in such manner as to be capable of a swinging movement alternately in opposite directions around the pivot $h$. This pivot $h$ is adjusted so that its axis (in other words, the axis of motion of the swinging disk G) is in a vertical line intersecting the axial line of the screw or blank when held in the jaws A, at the flat outer surface of the head of the blank or screw to be nicked. The nicking-saw being carried by the slide F, the latter is adjusted to bring the nicking-saw against the just-mentioned flat outer surface of the blank or screw to be nicked when the latter is in position in the jaws A.

It will be observed that, (the requisite rotary motion being given to the nicking-saw E,) if the nicking-saw is turned to the right or to the left, as the case may be, by the swinging of the disk G around its pivot $h$, it will cut one side of the head in a sloping direction, from the center of the head down through said side, thereby forming one-half of the sloped nick of the screw. If, now, the nicking-saw, by means of the disk G, is swung in the opposite direction, it will retrace its path through the part just cut, and will then cut a similar slope in the opposite side of the screw; a return movement of the disk G bringing the nicking-saw back to its original position after having thus cut a sloping half-nick at each side of the head, or, in other words, forming the nick with a double slope, as required, in the said head. It is this *modus operandi*, as embraced in a combination of parts, substantially as herein set forth, that constitutes the first element of my invention.

It will be observed that inasmuch as the slide F permits the nicking-saw E to be brought to or against the center of the head of the screw, as hereinbefore explained, irrespective of the diameter of the saw, it follows that the wear of the saw, or the substitution of one saw for another of different diameter, may be compensated by a simple adjustment of the said slide.

It will of course be understood that the axial line of the saw, being at one side of the axial line of the axis of motion of the disk, and the shaft of the saw projecting downward, provides, as it were, a crank, (indicated more particularly at $a'$,) from which, to a suitably-fixed portion of the machine, is extended a spiral spring, J, which tends to turn the disk in one direction around its pivot $h$. From this same crank $a'$ (if it may be so termed) extends a rod, $m$, the outer end of which is connected with a rock-lever, $n$, upon the lower end of which latter may be provided a friction-roller, $b'$. Bearing against this friction-roller $b'$ (in other words, against the lower edge of the rock-lever $n$) is a cam, $k$, provided on a shaft, L, which receives a rotatory movement by suitable connection with the driving-shaft or other rotating portion of the machine, this cam acting against the lower end of the rock-lever $n$, and through the rod $m$ turns the crank (so termed) $a'$ in a direction opposite to that in which it is drawn by the spiral spring J, the parts being made to move, by gearing and mechanism of suitable proportions, in due time and relation with each other.

The spring J turns the disk G in one direction to cause the nicking-saw E to cut the one-half of the double-sloped nick, as hereinbefore explained; which done, the cam $k$ operates the disk G to carry the nicking-saw in the opposite direction until the opposite side of the double-sloped nick is formed in the head of the blank or screw; which done, the action of the cam permits the spring to give the return movement to the parts, so that the nicking-saw is brought back to its original position at the center of the head of the blank or screw, thereby automatically performing the operation of making the requisite sloped nick in the head of said screw or blank.

It will be understood that although I have hereinbefore set forth that in the operation of the invention the axis of motion of the disk G is to be coincident with the axis of the blank or screw to be nicked at the flat outer surface of the head thereof, such forming a screw in which the nick will slope almost exactly from the center of the head, yet I do not limit myself to this specific construction, arrangement, or mode of operation, as it is just in some cases to depart from this. For example, by moving the disk G outward, so that this axis of motion shall intersect the axis of the screw or blank at a slight distance from the head thereof, the nick will be sloped in opposite directions, in the same manner as before, but with a wider space of metal between the two ends of the nick than when the parts are arranged as herein previously so fully set forth. On the other hand, if the disk G is moved inward, so that the axis of motion of the said disk would intersect the axis of the screw or blank at a point within the head, then the two sloping sides of the nick will intersect each other at the center of the head, thereby forming a depression at the center of the head, below the flat surface thereof, although less than the depth of the other portions of the double-sloped nick.

It will be seen from this that the shape and proportions of the nick may be very materially modified by the just herein-explained adjustment of the disk G. To provide for this adjustment, the supporting-plate I is made longitudinally adjustable upon the frame of the machine, this being most conveniently done, as indicated in Figs. 1 and 2, by means of set-screws $r$, working through slots $r'$, provided in the ends of the supporting-plate I, in such manner that, by loosening the screws $r$, the plate may be moved longitudinally to the requisite degree, and by tightening the screws $r$ the said plate will be fixed firmly in position.

What I claim as my invention is—

1. The nicking-saw, combined in relation with the jaws which hold the screw during the nicking operation, and with the cam $k$ and spring J, arranged to give the movement herein described to the nicking-saw in the operation of nicking the head of the screw or blank, substantially as and for the purpose herein set forth.

2. The holder I F G, carrying the nicking-saw, in combination with the holding-jaws A, the part G of said holder having its axial movement nearly or quite coincident with the center of the head of the screw or blank to be nicked, substantially as and for the purpose herein set forth.

3. The holder comprising the parts I F G, adjustable with reference to each other, in combination with the nicking-saw E, carried by the said holder, and the jaws holding the screw or blank during the operation of nicking, all substantially as and for the purpose herein set forth.

4. The combination of the holder I F G, made adjustable, as described, and carrying the nicking-saw E, with the jaws A, which hold the screw during the nicking operation, and suitable mechanism for operating the saw, all substantially as and for the purpose herein set forth.

THOS. J. SLOAN.

Witnesses:
H. WELLS, Jr.,
EDWARD HOLLY.